March 19, 1957  G. R. THOMAS ET AL  2,785,914
LOCKING MECHANISM FOR CONVERTIBLE TOP
Filed Sept. 4, 1953  2 Sheets-Sheet 1
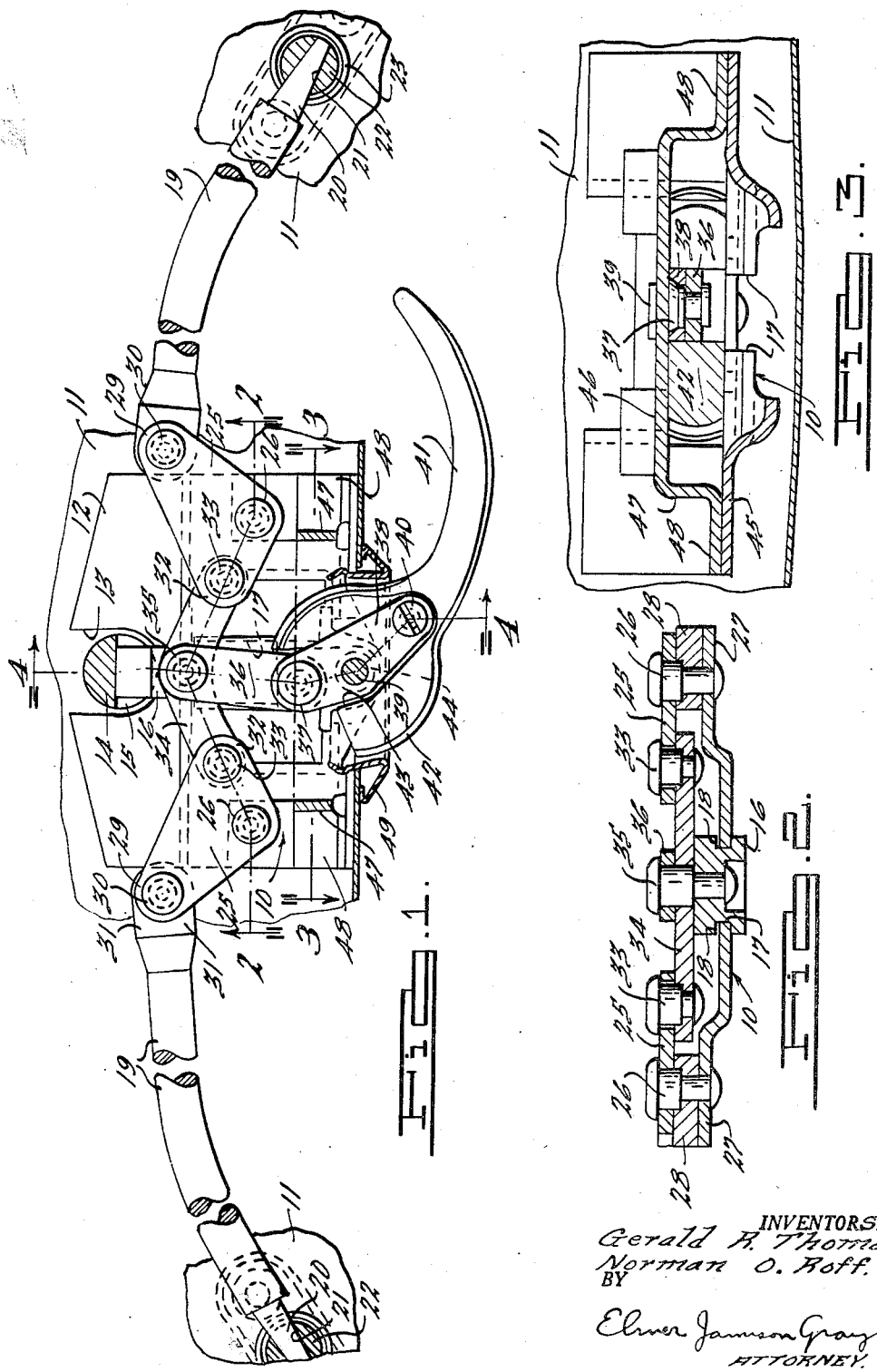
INVENTORS.
Gerald R. Thomas.
Norman O. Roff.
BY
Elmer Jamison Gray
ATTORNEY.

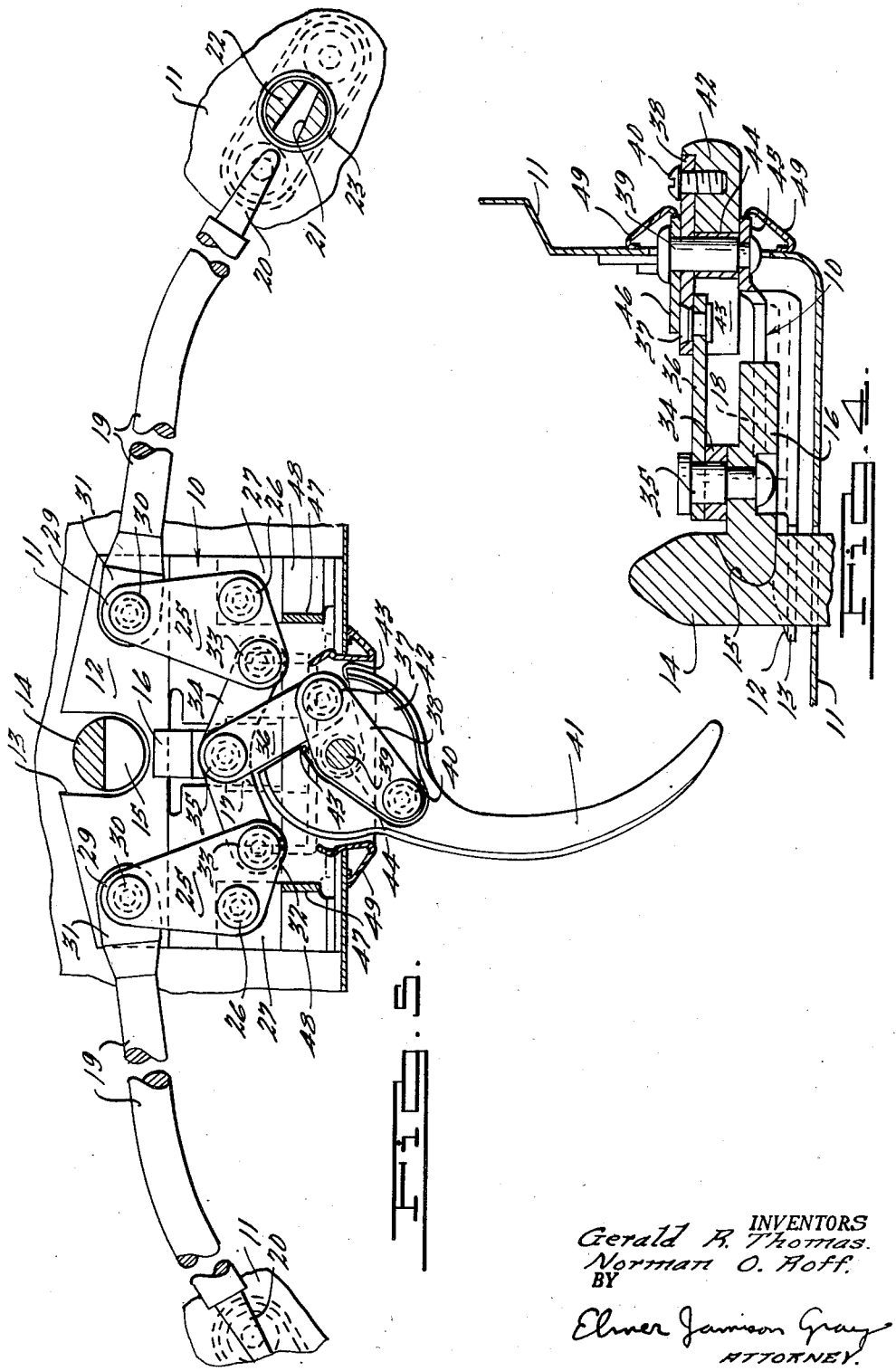

2,785,914

LOCKING MECHANISM FOR CONVERTIBLE TOP

Gerald R. Thomas, St. Clair Shores, and Norman O. Roff, Detroit, Mich., assignors, by mesne assignments, to Chrysler Corporation, a corporation of Delaware Application September 4, 1953, Serial No. 378,561

4 Claims. (Cl. 292—7)

This invention relates to improvements in convertible type vehicle bodies and in particular to an improved locking mechanism especially suitable for locking the folding top of such a vehicle in the unfolded condition.

In a common convertible or folding top construction, a top header of hollow construction contains a pair of transverse locking rods which extend in opposite directions from an intermediate handle operated mechanism also carried by the top header. The handle mechanism is operative when the top is completely unfolded to shift the locking rods laterally to latching positions in engagement with a corresponding pair of dowels or keepers which extend upward near opposite sides of the vehicle body from a fixed windshield header. In such constructions, the locking rods are connected with the handle operated mechanism for shifting in unison, so that if one locking rod is not properly aligned with its dowel or keeper and is thus blocked from shifting completely to its latching position, the other locking rod is likewise blocked from shifting and will only loosely engage its dowel or keeper. As a result the top will be insecurely locked and the locking rod loosely engaging its keeper will cause an objectionable rattle.

It is accordingly an important object of the present invention to provide an improved locking mechanism suitable for use with the folding top of a convertible type vehicle body which assures a positive rattle free interlocking between the top and body, yet which can be readily and quickly locked or unlocked by means of a single operating handle.

Another object is to provide such a construction wherein assembly and alignment of the interengageable locking elements carried by the top and body are simplified and wherein appreciable tolerance in the locating and mounting of said elements and in the wearing thereof is permitted without affecting the tightness of the locking engagement.

Another and more specific object is to provide such a construction wherein each of the two locking rods is pivotally connected to one of each of a pair of bell crank levers pivoted on the top header, whereby the locking rods are shifted laterally to and from their locking positions upon pivoting of their respective bell crank levers. A rocking cross member or equalizer link interposed between and pivotally connected to the two bell crank levers is arranged to be shiftable bodily by operations of the handle actuated mechanism, thereby to swing both bell crank levers in unison. By virtue of the equalizer link or member, when one locking rod engages its keeper before the other and begins to resist continued movement to the locking position, as will ordinarily result if the locking mechanisms at the two sides of the vehicle body are not identical within close tolerances, the application of continued force by the handle actuated mechanism tending to shift the equalizer link bodily will swing or rock the same with respect to the bell crank levers, permitting continued movement of the aforesaid other locking rod to its locking position independently of the first locking rod until the forces resisting the shifting of both locking rods to their respective locking positions are equalized.

Other objects of this invention will appear in the following description and appended claims, reference being had to the accompanying drawings forming a part of this specification wherein like reference characters designate corresponding parts in the several views.

Fig. 1 is a fragmentary plan view showing a locking device embodying the present invention in the locking position.

Fig. 2 is a fragmentary enlarged sectional view taken in the direction of the arrows substantially along the line 2—2 of Fig. 1.

Fig. 3 is a fragmentary enlarged sectional view taken in the direction of the arrows substantially along the line 3—3 of Fig. 1.

Fig. 4 is a fragmentary enlarged sectional view taken in the direction of the arrows substantially along the line 4—4 of Fig. 1.

Fig. 5 is a view similar to Fig. 1, showing the locking device in the unlocking position.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in an application for locking the forward header of a folding top to fixed portions of a convertible type vehicle body, such as a transverse body header comprising the upper part of the windshield frame. In the present instance a supporting plate or bracket 10 is suitably secured within the hollow structure of the folding top header 11, as for example by being welded therein. A downwardly offset forward platform 12 of the plate 10 is provided with a forwardly opening recess 13 centered on the longitudinal midline of the vehicle body to receive a central upright dowel or keeper 14 rigidly secured to the aforesaid transverse body header. The dowel projects upward through the recess 13 and is provided with a rearwardly opening notch or keeper engaging recess 15 adapted to receive the forward end of a longitudinally shiftable latch bolt 16 when the top is in the unfolded condition.

The confronting horizontal edges of a longitudinally extending slot 17 in the central portion of the plate 10, Fig. 2, extend into longitudinal lateral guide slots 18 at opposite sides of the bolt 16 and guide shifting of the latter longitudinally to and from locking and unlocking positions, Figs. 1 and 5 respectively. As indicated in Fig. 4, the upper edge of the notch 15 inclines rearwardly and the forward upper edge of the latch bolt 16 is correspondingly shaped, thereby to cam the top header 11 firmly downward into juxtaposition with the body header when the bolt 16 is forced forward to the locking position.

Also extending laterally within the hollow structure of the top header 11 in opposite directions from the support 10 are a pair of endwise shiftable locking rods 19 of steel or like resilient material bowed rearwardly near their lateral ends to achieve an inherent spring effect as described below. The lateral extremities 20 of the rods 19 comprise endwise declined cams in the manner of the central latch bolt 14 and are adapted upon lateral shifting of the locking rods 19 to the locking position to wedge into mating dowel openings 21 within lateral dowels 22 to cooperate with the bolt 16 in camming the top header 11 downward. Like the dowel 14, the dowels 22 are rigidly secured to the body header and project upward through openings 23 in the top header 11 when the top is in unfolded position.

The locking rods 19 are operated by means of a pair of bell cranks 25 pivotal on a pair of vertical studs 26 secured to upwardly offset portions 27 of the plate 10 adjacent opposite sides of the bolt 16, each pivot stud 26 being reinforced by a spacer 28 intermediate the corresponding bell crank 25 and portion 27. Each bell crank 25 is provided with a generally forwardly extending and transversely swinging arm or portion 29 pivotally connected at 30 to a flattened inner end 31 of the adjacent locking rod 19. Similarly a generally inwardly projecting and longitudinally swinging arm or portion 32 of each bell crank 25 is pivotally connected at 33 to one of each of the opposite ends of a generally transverse rockable and bodily shiftable equalizer link 34. A central forward apex of the latter is pivotally connected by a pin 35 to an intermediate portion of the latch bolt 16, whereby the link 34 is shiftable bodily forwardly or rearwardly with the bolt 16 and is also pivotal horizontally thereon.

Upon forward shifting of the bolt 16 the link 34 is also shifted bodily forward, swinging the bell crank portions 32 forwardly and the bell crank portions 29 laterally. The locking rods 19 are thus thrust endwise into locking engagement with the dowels or keepers 22 simultaneously with forward shifting of the bolt 16 into locking engagement with the dowel or keeper 14. In the event however that the end 20 of one locking rod 19 should not be properly aligned with its keeper opening 21 or should otherwise jam or stick, the link 34 will rock about the axis of the stud 35 and accelerate the endwise shifting of the other locking rod 19 until the endwise thrust on both rods 19 is substantially the same.

By way of example, if the right locking rod 19 in Fig. 5 should not properly and completely enter its keeper opening 21, the equalizer link 34 will pivot clockwise upon continued forward shifting of the latch bolt 16 and pivot stud 35. By virtue of the normal rearward disposition of the pivots 33 with respect to the pivot 35, a slight clockwise pivoting of link 34 will result in an appreciable acceleration of the endwise thrust of the left locking rod 19. In consequence the forward swinging of portion 32 and lateral portion 29 of the left bell crank 25 are accelerated with respect to corresponding movement of the right bell crank, causing the left locking rod 19 to shift into its proper locking position independently of the right locking rod. A similar situation prevails in the event that the left rod 19 should fail to shift completely to the locking position.

The slight initial bow in each locking rod 19 facilitates its bowing when subject to endwise thrust against its keeper 22, whereby if either locking rod 19 is prevented by improper alignment or other causes from properly entering its keeper opening 21, it will be maintained under spring tension by virtue of its inherent resiliency and will be urged yieldingly outward to the latching position as long as the bolt 16 is held at its forward latching position. Thereafter when the improperly latched rod 19 is subjected to vibration, as for example by operation of the vehicle, the aforesaid spring tension will ordinarily force the rod outward to the proper latching position.

Bodily shifting of the equalizer link 34 is accomplished by means of a driving link 36 having a forward end pivoted on the stud 35 and a rear end pivotally connected at 37 to the forward end of an operating link 38. The latter is pivoted intermediate its ends on a fixed vertical stud 39 to provide a generally rearward extending swinging end secured by means of a screw 40 to the intermediate neck portion of a swinging handle 41. The latter enlarges forwardly of the screw 40 to provide a head 42 having a forwardly opening notch 43. The base of the latter at the central portion of the head 42 comprises a cylindrical seat for a bushing 44 coaxial with the pivot 39, Fig. 4.

Prior to assembly of the screw 40, the handle 41 is readily installed by moving the head 42 forward until the bushing 44 seats firmly against the cylindrical seat portion of the notch 43. Thereafter the handle 41 is maintained in seated position with respect to the bushing 44 by the screw 40 which secures the operating link 38 and handle together for swinging as a unit. As indicated in Figs. 3 and 4, the link 38 overlies the link 36 and is recessed into the upper portion of the head 42 so as to be flush with the upper surface of the latter.

The underside of the handle head 42 is supported on an upwardly offset portion 45 of the supporting plate 10, Fig. 4. Closely overlying the flush upper surfaces of the handle head 42 and link 38 is a transverse bracket 46 spaced from the rearward portion 45 by vertical legs 47 having horizontal footings 48 suitably secured to the plate portion 45, as for example by being welded thereto.

The upper and lower ends of the pivot 39 project through and are anchored in the bracket 46 and plate portion 45 respectively. From the pivot 39 and bushing 44, the handle 41 extends rearwardly through an opening in the vertical wall of the header 11, the opening being partially concealed by a trim molding 49 secured to the header 11 around the head 42 and spaced therefrom to permit horizontal swinging of the handle 41 freely about the pivot 39.

In operation of the locking device, when the handle 41 is at the position of Fig. 5, extending directly rearwardly from the pivot 39, further clockwise pivoting of the handle 41 is blocked by abutting edges of the head 42 and driving link 36 within the notch 43. The links 36 and 38 comprise a toggle which is folded as indicated in Fig. 5 when the locking members or rods 19 and bolt 16 are at their unlocking positions. Upon counterclockwise pivoting of handle 41 about its axis 39 to adjacent the transverse position, Fig. 1, the toggle links 36, 38, are straightened to a dead center position of end-to-end alignment whereat the bolt 16 is at its foremost position in locking engagement with the stud or dowel 14. At this position the rods 19 are also normally wedged tightly into locking engagement with their dowels 22 and the entire locking device or mechanism is under tension by virtue of the inherent resiliency of the above described linkages, including the locking rods 19 which are slightly bowed under endwise tension tending to urge the bell crank portions 29 yieldingly inward and the transverse equalizer link 34 and bolt 16 rearward.

Upon continued clockwise pivoting of handle 41 slightly beyond the dead center position, the pivot 37 is moved to an over-center or locking position, Fig. 1, whereat further counterclockwise pivoting is blocked by abutting portions of the head 42 and link 36 within the notch 43. In consequence of the tension in the locking device urging the bolt 16 and equalizer link 34 rearward, the handle 41 is held at its locking position, Fig. 1, and objectionable rattling of the device is prevented. When sufficient force is applied to the handle 41 to swing the same clockwise beyond the dead center position of the toggle links 36, 38, against the aforesaid tension in the locking device, the device will be moved to the unlocking position, Fig. 5, whereat the bolt 16 and locking rods 19 are withdrawn from their respective keepers.

We claim:

1. In a locking device, supporting means, a pair of locking rods shiftable generally endwise relative to said supporting means and having outer ends adapted to engage keeper means upon outward shifting of said rods, said rods being of resilient material and being bowed intermediate their ends, a pair of bell cranks pivoted on said supporting means, each bell crank having an operating arm and also having a second arm pivotally connected to the inner end of one of each of said rods to shift the same outward upon swinging of the operating arm generally in one direction, a bodily shiftable and rockable equalizer link disposed between and pivotally connected to the operating arms of the two bell cranks, means for shifting said equalizer link in said one direction to force said locking rods outward tightly into locking engagement with said keeper means including a pair of toggle links pivotally connected together at one end of each, the other ends of said toggle links being pivotally connected to said equalizer link and to said supporting means respectively, said toggle links being in a partially folded condition beyond a dead center position of end-to-end alignment when said rods are in said locking engagement with said keeper means and being in a folded condition on the side of said dead center position opposite from said partially folded condition when said rods are retracted from said locking engagement, said rods in said locking engagement with said keeper means being under longitudinal compression tending to bow said rods and resisting unfolding of said links to said dead center position, means blocking folding of said toggle links beyond said partially folded condition, and handle means for swinging said toggle links.

2. In a locking device, supporting means, a pair of locking rods shiftable generally endwise relative to said supporting means, said rods being of resilient material and being bowed intermediate their ends, means for shifting said rods including a pair of bell cranks pivoted on said supporting means, each bell crank having one arm connected to one of each of said rods and also having a forwardly swinging second arm, a forwardly shiftable equalizer link interposed between and pivotally connected to said second arm of each bell crank to swing the same forwardly, the pivotal connection of said one arm of each bell crank with the corresponding rod being on a radius from the pivot axis of the bell crank that swings generally endwise of said corresponding locking rod upon forward swinging of the second arm of the bell crank, thereby to shift said locking rods endwise upon forward shifting of said equalizer link, said rods being adapted to engage keeper means tightly when thrust endwise by forward shifting of said equalizer link, thereby subjecting said locking device to tension resulting from its inherent resiliency, means for forcing said equalizer link forward against the tension in said locking device when said rods are tightly engaged with their keeper means comprising a pair of pivotally connected toggle links, the outer end of one toggle link being pivotally connected to said equalizer link intermediate the latter's pivotal connections with the second arms of said bell cranks and the outer end of the other toggle link being pivotally connected to said supporting means rearwardly of said equalizer link, said toggle links being thereby unfoldable to force said equalizer link forward, means to limit over center movement of the pivotal connection between said toggle links in one direction at a location adjacent the unfolded position of the latter pivotal connection, and means for moving said latter pivotal connection oppositely to said one direction to fold said toggle links.

3. In a device for locking the top header means of a folding top for a convertible type vehicle to header means on the vehicle body, a pair of generally endwise shiftable locking rods carried by one of said header means and extending transversely of the vehicle body, said rods being shiftable into locking engagement with keeper means on the other header means when the top is unfolded, a pair of bell cranks pivoted on said one header means and pivotally connected with said locking rods respectively to shift the same into said locking engagement, each bell crank having a portion on a radius thereof that swings generally in a given direction when said rods are shifted into said locking engagement, an intermediate latch bolt carried by said one header means and shiftable longitudinally of the vehicle body into locking engagement with a keeper on said other header means, a transversely extending rockable equalizer means pivotally connected to said portions and pivoted about a vertical axis on said intermediate latch bolt to shift therewith, and means for shifting said equalizer means in said direction.

4. In a device for locking the top header means of a folding top for a convertible type vehicle to header means on the vehicle body, a pair of generally transversely shiftable and oppositely directed locking rods carried by one of said header means and extending transversely of the vehicle body, the lateral ends of said rods being adapted to be shifted into locking engagement with keeper means on the other header means when the top is unfolded, a pair of bell cranks pivoted on said one header means at transversely spaced locations adjacent the inner ends of said rods respectively, each bell crank being pivotally connected to the adjacent inner end of one of each of said rods to shift the rod into said latching engagement, each bell crank also having a portion pivotal in a given direction generally longitudinally of said body upon shifting of the pivotally connected rod to said latching engagement, an intermediate latch bolt carried by said one header means and shiftable generally longitudinally of the vehicle body into locking engagement with a keeper on said other header means, a transversely extending equalizer link disposed between and pivotally connected to the last named portions of said bell cranks and also pivoted about a vertical axis on said latch bolt intermediate said portions, and means for shifting said latch bolt in said direction.

References Cited in the file of this patent

UNITED STATES PATENTS

| 1,269,311 | Rixson | June 11, 1918 |
| 2,360,524 | Simpson | Oct. 17, 1944 |
| 2,411,945 | Vigmostad | Dec. 3, 1946 |
| 2,560,459 | Lundberg et al. | July 10, 1951 |
| 2,570,260 | Milhan | Oct. 9, 1951 |
| 2,570,261 | Milhan | Oct. 9, 1951 |

FOREIGN PATENTS

| 664,389 | Great Britain | Jan. 2, 1952 |